(12) United States Patent
Kubo et al.

(10) Patent No.: US 7,198,141 B2
(45) Date of Patent: Apr. 3, 2007

(54) SHOCK ABSORBING APPARATUS IN A POSITIONING APPARATUS

(75) Inventors: Tadayuki Kubo, Ibaraki (JP); Takeshi Sasaki, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/653,287

(22) Filed: Sep. 3, 2003

(65) Prior Publication Data
US 2004/0046294 A1    Mar. 11, 2004

(30) Foreign Application Priority Data
Sep. 10, 2002   (JP)   ............................. 2002-263464

(51) Int. Cl.
*F16C 32/06*    (2006.01)
(52) U.S. Cl. .................... 188/380; 74/490.09
(58) Field of Classification Search ............. 384/9–12; 318/687, 653; 188/378–380; 74/490.08, 74/490.09
See application file for complete search history.

(56) References Cited

U.S. PATENT DOCUMENTS

| | | | | |
|---|---|---|---|---|
| 3,578,278 | A | * | 5/1971 | Pickering et al. ............ 248/550 |
| 3,917,201 | A | * | 11/1975 | Roll ............................. 248/550 |
| 4,744,675 | A | * | 5/1988 | Sakino et al. .................. 384/12 |
| 5,040,431 | A | * | 8/1991 | Sakino et al. ............. 74/490.09 |
| 5,280,677 | A | | 1/1994 | Kubo et al. ..................... 33/568 |
| 5,445,045 | A | * | 8/1995 | Nagai et al. .............. 74/490.09 |
| 5,467,720 | A | | 11/1995 | Korenaga et al. .............. 108/20 |
| 5,760,564 | A | * | 6/1998 | Novak ........................ 318/687 |
| 5,799,543 | A | * | 9/1998 | Nagai et al. .............. 74/490.09 |
| 5,803,213 | A | * | 9/1998 | Davis et al. ................. 188/378 |
| 6,129,185 | A | * | 10/2000 | Osterberg et al. ......... 188/267.2 |
| 6,170,622 | B1 | * | 1/2001 | Wakui et al. ................ 188/378 |
| 6,329,780 | B1 | * | 12/2001 | Ebihara et al. ............. 318/649 |
| 6,408,045 | B1 | | 6/2002 | Matsui et al. .................. 378/34 |

(Continued)

FOREIGN PATENT DOCUMENTS

DE       19735479       2/1999

(Continued)

OTHER PUBLICATIONS

European Search Report dated Dec. 17, 2003, issued in corresponding European pat nt appln. No. 03 02 0096, forwarded in a Communication dated Dec. 29, 2003.

*Primary Examiner*—Christopher P. Schwartz
(74) *Attorney, Agent, or Firm*—Fitzpatrick, Cella, Harper & Scinto

(57) ABSTRACT

A shock absorbing apparatus in a positioning apparatus including a stage apparatus is disclosed. The positioning apparatus includes a main body apparatus for mounting the stage apparatus thereto, and a chamber for maintaining a region, in which the stage apparatus is disposed, under a condition of vacuum or purged ambience. The shock absorbing apparatus includes a shock absorber provided at a stroke end of the stage apparatus, and a support member provided separately from the stage apparatus, to which the shock absorber is fixed. In the shock absorbing apparatus of the present invention, the shock absorbing apparatus is fixed to the support member provided separately from the stage apparatus including a driving system, and accordingly an increase in size of the stage apparatus can be prevented, and high-speed and highly-precise positioning of an object to be positioned can be performed in a non-atmospheric ambience.

6 Claims, 9 Drawing Sheets

U.S. PATENT DOCUMENTS

| | | | |
|---|---|---|---|
| 6,454,063 B1 * | 9/2002 | Osterberg et al. | 188/379 |
| 6,510,755 B1 * | 1/2003 | Higuchi et al. | 74/490.09 |
| 6,644,855 B2 * | 11/2003 | Sakino et al. | 384/9 |
| 2002/0075469 A1 * | 6/2002 | Tanaka | 355/72 |
| 2002/0085192 A1 * | 7/2002 | Miura et al. | 355/73 |
| 2002/0118897 A1 * | 8/2002 | Sakino et al. | 384/12 |

FOREIGN PATENT DOCUMENTS

| | | |
|---|---|---|
| JP | 61-267245 | 11/1986 |
| JP | 3-185327 | 8/1991 |
| JP | 7-256534 | 10/1995 |
| JP | 10-340938 | 12/1998 |
| JP | 10/340938 | 12/1998 |
| JP | 11-288876 | 10/1999 |
| JP | 11-316607 | 11/1999 |
| JP | 2003-217998 | 7/2003 |

* cited by examiner

SHOCK ABSORBING APPARATUS IN A POSITIONING APPARATUS

This application is based on Japanese Patent Application No. 2002-263464 filed Sep. 10, 2002, the entire disclosure of which is incorporated by reference herein.

BACKGROUND OF THE INVENTION

1. Field of the Invention

The present invention relates to a shock absorbing apparatus provided in a positioning apparatus, such as moving-guiding alignment apparatuses of electron beam drawing equipment, precision measurement equipment, and the like, in which high-speed movement and precise positioning are repeated, or scanning movement is precisely performed in a non-atmospheric ambience, for example. The present invention further relates to an apparatus, such as an exposure apparatus, incorporating such a shock absorbing apparatus.

2. Description of the Related Background Art

FIG. 13 is a plan view illustrating an X-Y stage of a conventional positioning apparatus. FIG. 14 is an end view of FIG. 13. In FIGS. 13 and 14, there are shown a base surface plate 501, an X-direction movement substrate 502, and a Y-direction movement substrate 503. A guide member 504 for guiding the X-direction movement substrate 502 along the X-direction of a first alignment direction is provided on the base substrate 501, and a guide member 505 for guiding the Y-direction movement substrate 503 along the Y-direction of a second alignment direction is provided on the X-direction movement substrate 502. A guide block member 506 movable along the guide member 504 is provided on the bottom surface of the X-direction movement substrate 502, and a guide block member 507 movable along the guide member 505 is provided on the bottom surface of the Y-direction movement substrate 503. An overhead plate member 509 for mounting thereto a chucking apparatus for supporting a sample, or the like is provided on the Y-direction movement substrate 503, and reflective mirrors 510 and 511 for position measurement are mounted to the overhead plate member 509. Shock absorbers (shock absorbing apparatuses) 512 are disposed, through a mounting member 513, at places corresponding to stroke ends of the X-direction movement substrate 502 on the base surface plate 501, respectively. Other shock absorbers (shock absorbing apparatuses) 512 are likewise disposed, through a mounting member 514, at places corresponding to stroke ends of the Y-direction movement substrate 503 on the X-direction movement substrate 502, respectively.

Further, Japanese Patent Laid-Open Application No. 10(1998)-340938 discloses an apparatus in which a shock absorber is used in a driving system for a conveyance arm contained in a vacuum chamber. In this apparatus, a driving mechanism for rotating and ascending or descending a cassette surface plate for mounting thereon a wafer cassette in a load-lock chamber is provided, and the driving mechanism is comprised of a rotary actuator and a cassette elevator, and is installed in a housing outside the load-lock chamber. A bellows is provided around the driving axis of the driving mechanism such that a gas-tight condition can be maintained during the movement in the axial direction. The shock absorber for absorbing shock during operation for positioning at a descending end portion of the cassette elevator is provided thereat.

In the conventional apparatus as illustrated in FIGS. 13 and 14, however, when the X-Y stage is situated in the vacuum chamber, it is difficult to readily obtain a compact and light-weight shock absorber which is a vacuum-adapted shock absorbing apparatus. Further, where a bellows member is used to construct a fully enclosed cover for the shock absorber, a compact design is difficult, and the size of a stage apparatus is likely to increase, incurring a large-sized vacuum chamber and large-sized accompanying equipment such as a vacuum pump. The cost of the apparatus is also likely to increase. Furthermore, it takes a long time to exhaust the large-sized vacuum chamber to a desired level of pressure, and a long time is needed to perform its maintenance and so forth. Its productivity is hence lowered. Additionally, if the shock absorber operates repeatedly, fluid in the shock absorber threatens to leak into the chamber.

On the other hand, the apparatus of the above-noted Japanese reference solves such problems (i.e., problems of the increase in size, and the fear of leaks) by placing the shock absorber outside the vacuum chamber. In this apparatus, however, a highly-rigid delivery system is difficult to construct, and since the bellows is provided around the driving axis to keep a gas-tight condition during the operation of driving in the axial direction, external disturbing factors are liable to be transmitted through the bellows to an object to be positioned.

SUMMARY OF THE INVENTION

According to one aspect of the present invention, there is provided a shock absorbing apparatus in a positioning apparatus which includes a stage apparatus, a main body apparatus for mounting the stage apparatus thereto, and a chamber for maintaining a region, in which the stage apparatus is disposed, under a condition of vacuum or purged ambience. The shock absorbing apparatus includes a shock absorber provided at a stroke end of the stage apparatus, and a support member provided separately from the stage apparatus, to which the shock absorber is fixed. In such a shock absorbing apparatus of the present invention, the shock absorbing apparatus is fixed to the support member provided separately from the stage apparatus including a driving system, and accordingly an increase in size of the stage apparatus can be prevented, and high-speed and highly-precise positioning of an object to be positioned can be performed in a non-atmospheric ambience.

Based on the above-discussed fundamental construction, the following more specific structures can be preferably employed in the shock absorbing apparatus of the present invention.

The support member can be a partition member of the chamber. In this case, more specifically, the shock absorbing apparatus can be comprised of the shock absorber; a rod member one end of which is inserted into the chamber, and the other end of which is pressed against the shock absorber disposed outside the chamber; a sealing member one end of which is fixed to the rod member under a gas-tight condition, and the other end of which is fixed to the shock absorber, or a mounting member for the shock absorber under a gas-tight condition; a guide member for the rod member; and a flange member which is disposed approximately concentrically with the rod member, and fixes the shock absorber, or the mounting member to a partition member of the chamber under a gas-tight condition. In this construction, since the shock absorber is disposed outside the partition member of the chamber, environmental pollution or contamination in the chamber due to leaks of fluid from the shock absorber can be prevented.

Further, the mounting member for the shock absorber can be provided with a thin portion. In this structure, even when an excessive force acts on the shock absorbing apparatus, the thin portion is deformed or damaged in the first place such that deformation and destruction or damage of the chamber can be assuredly prevented. Resultantly, ambience in the chamber can be maintained under a preferable condition.

The shock absorber can be supported by a support member mounted to the main body apparatus. Also in this structure, even if an excessive force acts on the shock absorbing apparatus, the support member side is deformed or damaged precedently such that destruction or damage of the chamber can be assuredly prevented. Thereby, ambience in the chamber can be kept under a preferable condition. In this case, more specifically, the shock absorbing apparatus can be comprised of the shock absorber, a rod member one end of which is inserted into the chamber, and the other end of which is pressed against the shock absorber disposed outside the chamber; a flange member which is disposed approximately concentrically with the rod member, and fixes the rod member to a partition member of the chamber under a gas-tight condition; a guide member for the rod member; a sealing member one end of which is fixed to the rod member under a gas-tight condition, and the other end of which is fixed to the flange member under a gas-tight condition, and the support member for supporting the shock absorber, or a mounting member for the shock absorber, which is fixed to a base surface plate of the main body apparatus.

Further, the shock absorbing apparatus can include a second sealing member for enclosing a space formed outside the chamber by the sealing member and the support member under a gas-tight condition; a third sealing member for maintaining a clearance between the rod member and the support member under a gas-tight condition; and a unit for bringing the space enclosed by the second sealing member under an approximately vacuum condition. In this construction, force acting on the shock absorbing apparatus from outside can be cancelled by a differential pressure between inside and outside of the chamber, and accordingly collision energy can be effectively and assuredly absorbed softly.

According to another aspect of the present invention, there is provided a positioning apparatus including the above-discussed shock absorbing apparatus. In this construction, when the stage apparatus is an X-Y stage, it is possible to accomplish high-speed and highly-precise two-dimensional positioning in a non-atmospheric ambience. Further, when the main body apparatus is an electron-beam drawing apparatus, it is possible to provide a highly-precise and relatively-inexpensive apparatus.

These advantages, as well as others will be more readily understood in connection with the following detailed description of the preferred embodiments and examples of the invention in connection with the drawings.

DESCRIPTION OF THE PREFERRED EMBODIMENTS

Embodiments of a shock absorbing apparatus, and an apparatus incorporating the shock absorbing apparatus of the present invention will be described with reference to the drawings.

(First Embodiment)

Figure 1:
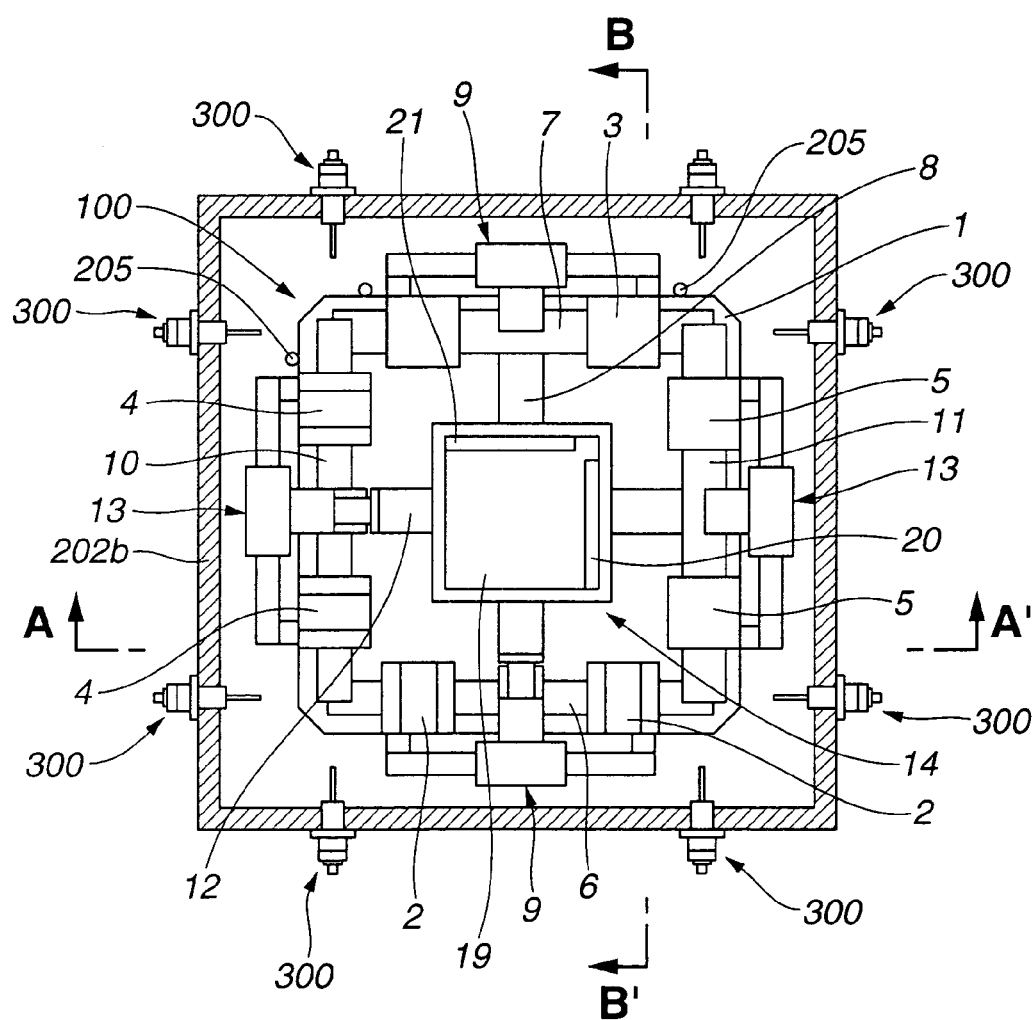
FIG. 1 is a plan view illustrating a first embodiment of a shock absorbing apparatus in a positioning apparatus according to the present invention.
Figure 2:
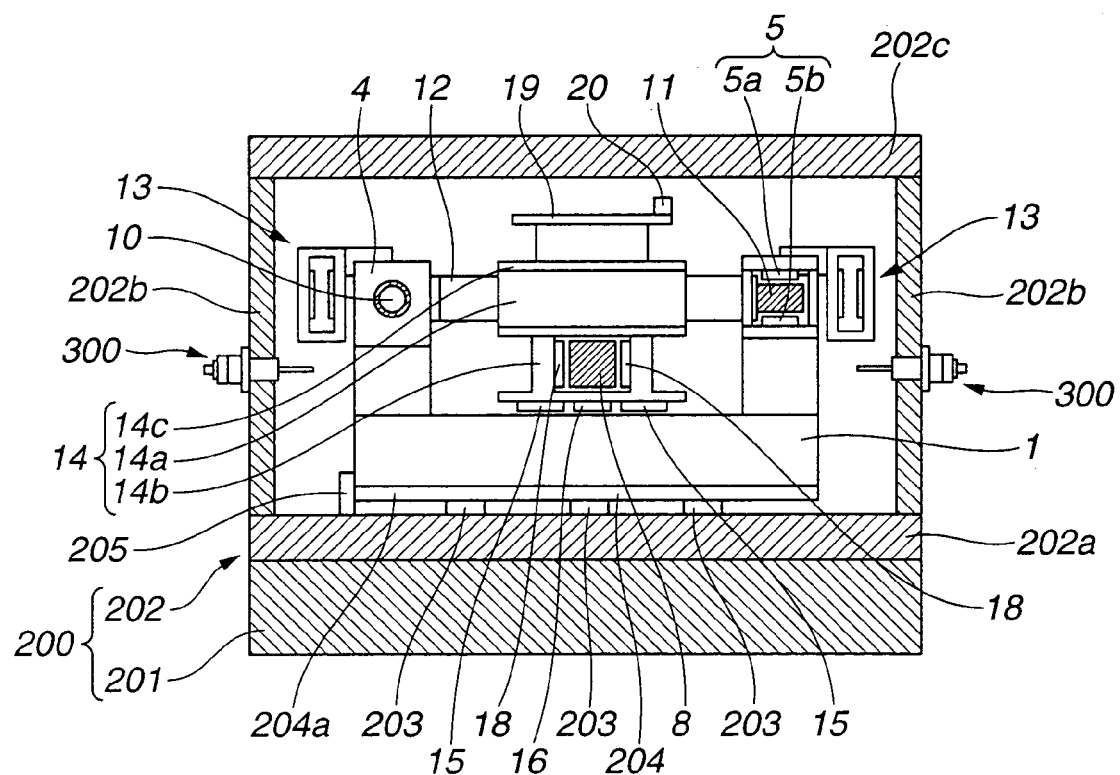
FIG. 2 is a cross-sectional view taken along the line A–A' of FIG. 1.
Figure 3:
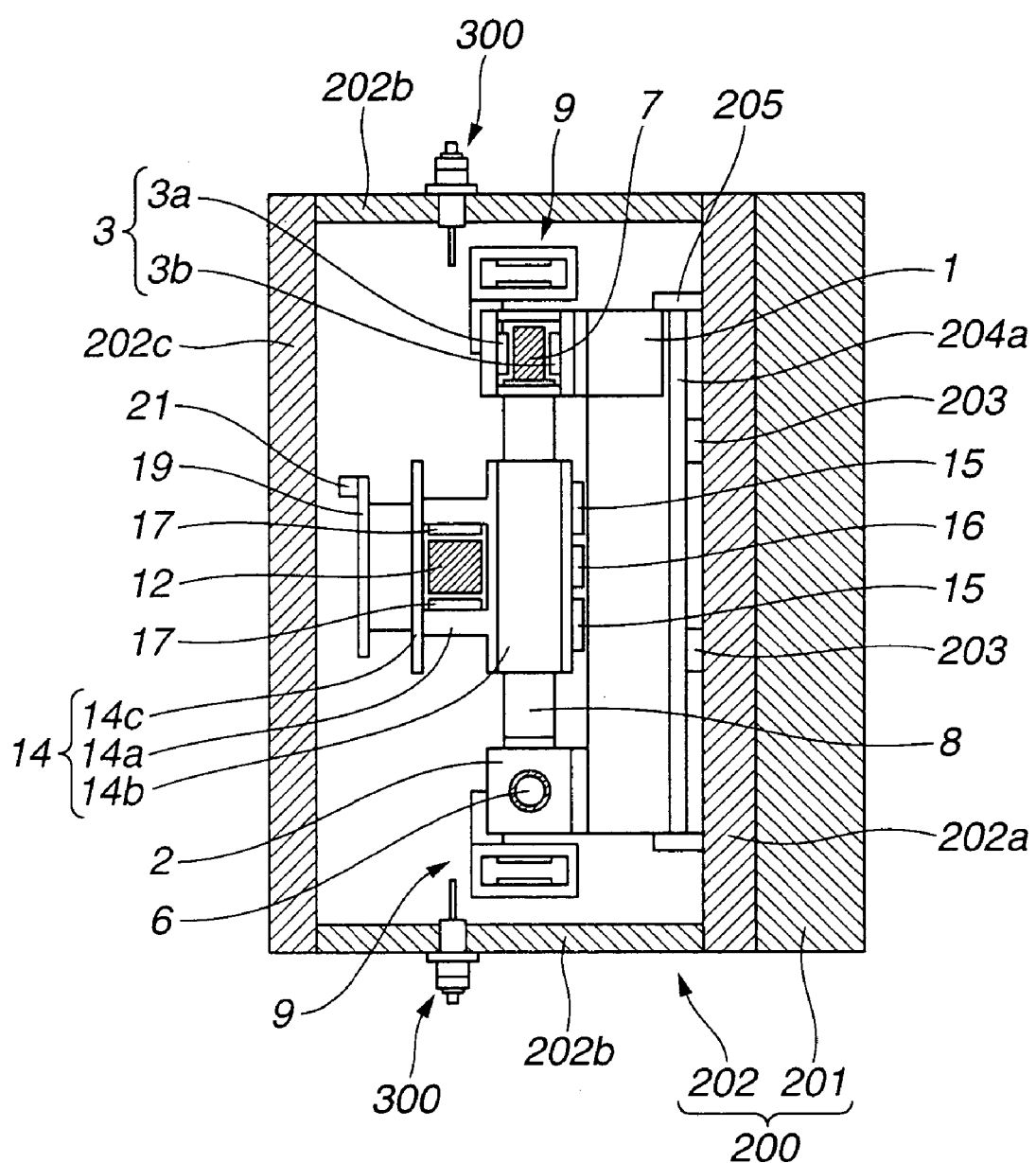
FIG. 3 is a cross-sectional view taken along the line B–B' of FIG. 1.

A first embodiment of a shock absorbing apparatus in a positioning apparatus of the present invention will be described with reference to FIGS. 1 to 3. FIG. 1 is a plan view illustrating the positioning apparatus of the first embodiment. FIG. 2 is a cross-sectional view taken along the line A–A' of FIG. 1, and FIG. 3 is a cross-sectional view taken along the line B–B' of FIG. 1. An X-Y stage apparatus 100 in the first embodiment is comprised of the following components or elements. Those are a base surface plate 1, an X-axis static pressure radial bearing 2, an X-axis static pressure plane bearing 3 including bearings 3a and 3b disposed facing each other, a Y-axis static pressure radial bearing 4, a Y-axis static pressure plane bearing 5 including bearings 5a and 5b disposed facing each other, an X-axis radial moving member 6, an X-axis plane moving member 7, an X-axis driving member 8, an X-axis linear motor 9, a Y-axis radial moving member 10, a Y-axis plane moving member 11, a Y-axis driving member 12, a Y-axis linear motor 13, and an X-Y moving member 14 comprised of an X-axis moving member 14a, a Y-axis moving member 14b, and an overhead plate 14c which are fixed to each other in one united form.

A bearing 15 and a permanent magnet 16 serving as a preloading unit are arranged on a lower surface of the Y-axis moving member 14b such that the X-Y moving member 14 can be guided along an upper reference face of the base surface plate 1 under a non-contact condition. A bearing 17 is provided on a face facing a side face of the Y-axis driving shaft 12 for the X-axis moving member 14a such that the X-axis moving member 14a can be movably guided in the X-axis direction along the side face of the Y-axis driving member 12. A bearing 18 is provided on a face facing a side face of the X-axis driving shaft 8 for the Y moving member 14b such that the Y moving member 14b can be movably guided in the Y-axis direction along the side face of the X driving member 8. There is arranged on the overhead plate 14*c* a top table plate member 19 for mounting thereto a chucking apparatus, or the like for supporting a sample. Reflective mirrors 20 and 21 for measuring positions are mounted to the top table plate member 19.

A main body apparatus 200 is comprised of the following components or elements. Those are a main body surface plate 201, a vacuum chamber 202, a spacer 203, and a mounting plate 204. The vacuum chamber 202 includes a bottom plate 202*a*, a side plate 202*b*, and a top table plate 202*c*, and the vacuum chamber 202 is fixed to the main body surface plate 201. The main body surface plate 201 is mounted on a support mechanism such as an anti-vibration support (not shown). The spacers 203 are disposed at three locations approximately equidistantly arranged about the center of gravity of the X-Y stage apparatus 100. The mounting plate 204 includes a surface 204*a* for supporting the X-Y stage apparatus 100, and is supported at three points by the spacers 203. The X-Y stage apparatus 100 is mounted on the supporting surface 204*a* by the above structure, and is aligned and fixed to the main body apparatus 200 by alignment pins 205. An exhaust pipe and a vacuum pump (not shown) are connected to the vacuum chamber 202 such that an inner space of the vacuum chamber 202 can be vacuumed, or purged with $N_2$, He, or the like.

Figure 4:
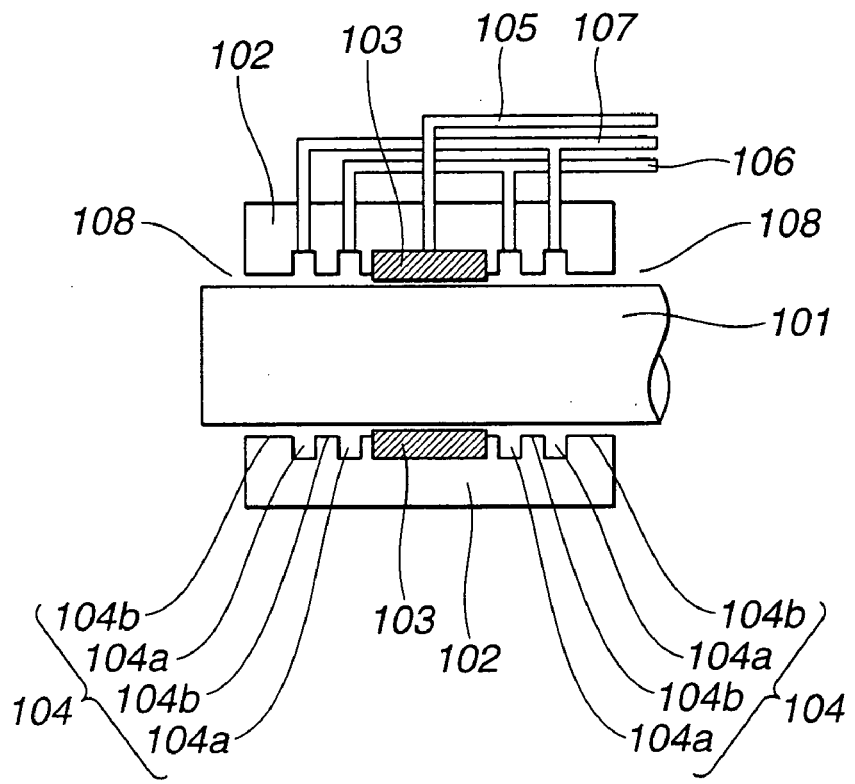
FIG. 4 is a cross-sectional view illustrating a portion of a static pressure radial bearing in the structure of FIG. 1.

FIG. 4 is a schematic cross-sectional view of the X-axis static pressure radial bearing 2 and the Y-axis static pressure radial bearing 4. In FIG. 4, denoted at 101 is a cylindrical axial member having a circular cross section, which corresponds to the X-axis radial moving member 6 or Y-axis radial moving member 10. Denoted at 102 is a housing disposed approximately concentrically with the axial member 101, on an inner radial portion of which a bearing bush 103 is provided. Denoted at 104 is a differential exhaust portion provided at each end portion of the bearing bush 103, which is composed of at least two labyrinth grooves 104*a* and at least two land portions 104*b*.

In the above-discussed structure, when a pressurized fluid is supplied to the bearing bush 103 through a delivery port 105 via a feed-through (not shown) provided in the side plate 202*b* of the vacuum chamber 202, the cylindrical axial member 101 is supported under a non-contact condition. The pressurized fluid ejected from the bearing bush 103 is forcedly exhausted by a vacuum pump (not shown) connected to exhaust pipes 106 and 107 via the feed-through (not shown) provided in the side plate 202*b* of the vacuum chamber 202. Only a very small amount of the pressurized fluid leaks out from a minute clearance 108.

Figure 5:
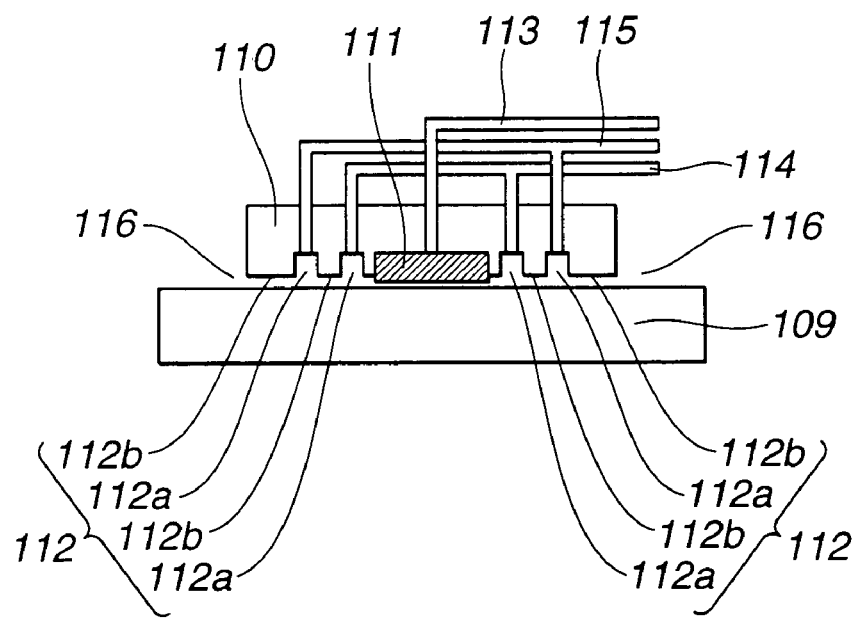
FIG. 5 is a cross-sectional view illustrating a portion of a static pressure plane bearing in the structure of FIG. 1.

FIG. 5 is a schematic cross-sectional view of bearings 3*a*, 3*b*, 5*a* and 5*b* constituting the X-axis static pressure planer bearing 3 and the Y-axis static pressure planer bearing 5, respectively, and bearings 15, 17 and 18. In FIG. 5, denoted at 109 is a planer axial member which corresponds to the X-axis planer moving member 7, Y-axis planer moving member 11, X-axis driving member 8, Y-axis driving member 12, or base surface plate 1. Denoted at 110 is a housing disposed approximately parallel to the planer axial member 109, on a central portion of which a bearing pad 111 is provided. Denoted at 112 is a differential exhaust portion provided surrounding the bearing pad 111 approximately concentrically therewith, which is composed of at least two labyrinth grooves 112*a* and at least two land portions 112*b*.

In the above-discussed structure, when a pressurized fluid is supplied to the bearing pad 111 through a delivery port 113 via the feed-through (not shown) provided in the side plate 202*b* of the vacuum chamber 202, the planer axial member 109 is supported relative to the housing 110 under a non-contact condition. The pressurized fluid ejected from the bearing pad 111 is forcedly exhausted by a vacuum pump (not shown) connected to the exhaust pipes 114 and 115 via the feed-through (not shown) provided in the side plate 202*b* of the vacuum chamber 202. Only a very small amount of the pressurized fluid leaks out from a minute clearance 116.

Figure 6:
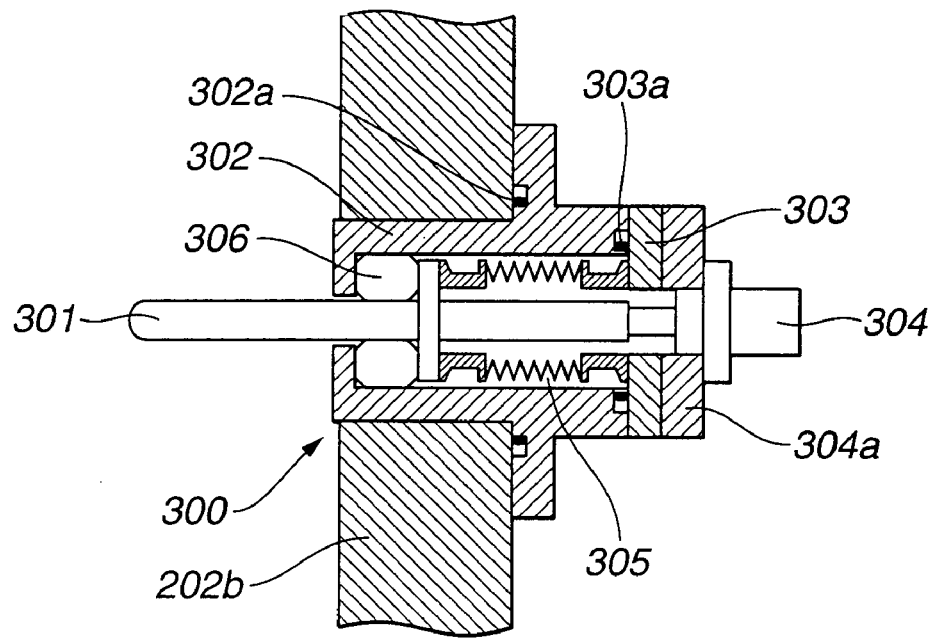
FIG. 6 is a cross-sectional view illustrating the shock absorbing apparatus provided in the positioning apparatus of the first embodiment.

FIG. 6 is an enlarged view of parts of FIGS. 2 and 3, and illustrates the structure of a shock absorbing apparatus 300 of this embodiment. The shock absorbing apparatus 300 is fixed to the side plate 202*b* of the vacuum chamber 202. In FIG. 6, denoted at 301 is a rod member. Denoted at 302 is a flange member which is constructed approximately concentrically with the rod member 301, and is fixed to the side plate 202*b* under a gas-tight condition with an O-ring 302*a* interposed between the flange member 302 and the side plate 202*b*. Denoted at 303 is a cover member for the flange member 302, and a junction boundary between the flange member 302 and the cover member 303 is maintained under a gas-tight condition by an O-ring 303*a*. Denoted at 304 is a shock absorber pressed against an outer end portion of the rod member 301. Denoted at 304*a* is a mounting plate for mounting the shock absorber 304 to the flange member 302. Denoted at 305 is a bellows serving as a sealing member, and one end thereof is fixed to an intermediate portion of the rod member 301 under a gas-tight condition by welding or the like, while the other end thereof is fixed to the cover member 303 under a gas-tight condition by welding or the like. Denoted at 306 is a guide member for guiding the rod member 301.

In the above-discussed structure, the rod member 301 is inserted into the vacuum chamber 202 while the gas-tight condition is maintained by the bellows 305. The rod member 301 can hence transmit collision energy, which is to be input into its inner end present in the vacuum chamber 202, to the shock absorber 304 disposed outside the vacuum chamber 202, and can absorb the collision energy while the gas-tight condition of the vacuum chamber 202 is maintained.

In the first embodiment described above, the X-Y moving member 14 of the X-Y stage apparatus 100 can be rapidly and precisely positioned, or scan-driven by the X-axis linear motor 9 and the Y-axis linear motor 13 along X-axis and Y-axis directions in the vacuumed or purged ambience. During such movement, changes in pressure, contamination and the like of the vacuumed or purged ambience can be prevented, since leak of the pressurized fluid from the static pressure bearings 2, 3, 4, 5, 15, 17, and 18 is differentially exhausted and only a very small amount of the pressurized fluid leaks into the vacuum chamber 202.

Further, the shock absorbing apparatus 300 effectively absorbs the collision energy of violent run due to unexpected troubles without any fear of leaks of fluid in the shock absorber 304 into the vacuum chamber 202. Accordingly, it is possible to prevent deformation and destruction or damage of the X-Y stage apparatus 100 and the vacuum chamber 202, degradation of a degree of vacuum of the vacuum chamber 202, and destruction or damage of accompanying equipment such as a turbo molecular pump. Furthermore, the shock absorbing apparatus 300 is simply and compactly mounted to a support member (in this embodiment, the partition member of the vacuum chamber 202) other than the stage apparatus including the driving system, and hence an increase in size of the entire apparatus due to addition of the shock absorbing apparatus can be prevented, and rapid and precise positioning driving cannot be adversely affected.

(Second Embodiment)

Figure 7:
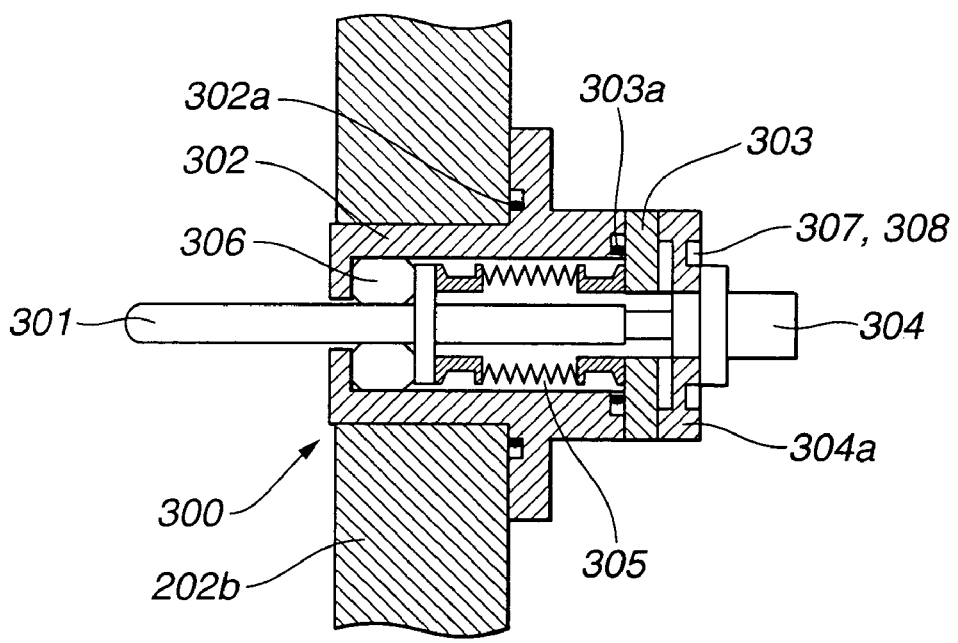
FIG. 7 is a cross-sectional view illustrating a second embodiment of a shock absorbing apparatus in a positioning apparatus according to the present invention.
Figure 8:
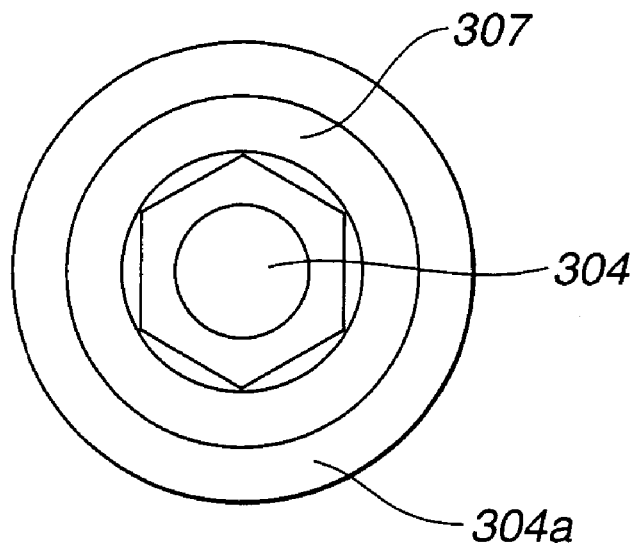
FIG. 8 is an end view illustrating a portion of the shock absorbing apparatus of FIG. 7.

A second embodiment of a shock absorbing apparatus of the present invention will be described with reference to FIGS. 7 and 8. FIG. 7 is an enlarged view of parts of FIGS. 2 and 3, and illustrates the structure of a shock absorbing apparatus 300 of this embodiment. FIG. 8 is an end view of FIG. 7. The shock absorbing apparatus 300 of the second embodiment is different from that of the first embodiment in that a mounting plate 304a is provided with an annular thin portion 307 formed approximately concentrically with the shock absorber 304.

Also in the above-discussed structure, the rod member 301 is inserted into the vacuum chamber 202 while the gas-tight condition is maintained by the bellows 305. The rod member 301 can hence transmit collision energy, which is to be input into its inner end present in the vacuum chamber 202, to the shock absorber 304 arranged outside the vacuum chamber 202, and can absorb the collision energy while the gas-tight condition of the vacuum chamber 202 is maintained. In this structure, when an excessive force acts on the rod member 301, the annular thin portion 307 is deformed or damaged in the first place such that deformation or destruction of the side plate 202b of the vacuum chamber 202 can be more assuredly prevented. With respect to other points, the second embodiment is the same as the first embodiment.

(Third Embodiment)

Figure 9:
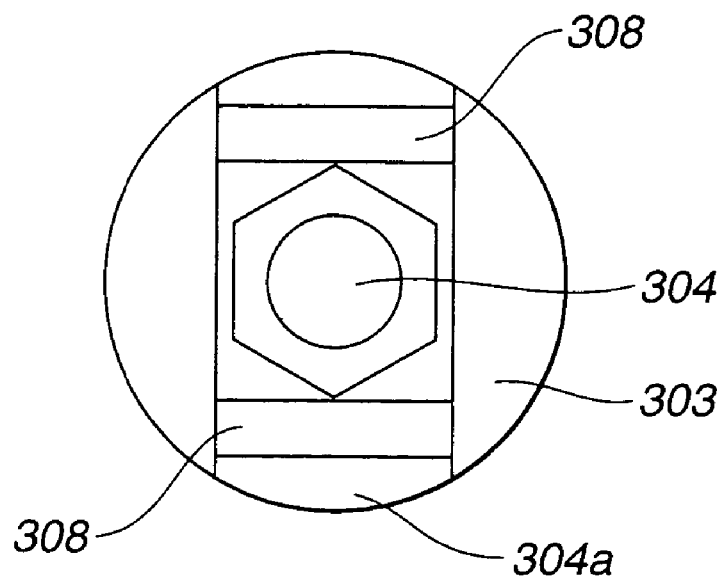
FIG. 9 is an end view illustrating a third embodiment of a shock absorbing apparatus in a positioning apparatus according to the present invention.

A third embodiment of a shock absorbing apparatus of the present invention will be described with reference to FIGS. 7 and 9. FIG. 9 is an end view of FIG. 7. The shock absorbing apparatus 300 of the third embodiment is different from that of the first embodiment in that a mounting plate 304a is provided with a beam-like thin portions 308.

Also in the above-discussed structure of the third embodiment, the rod member 301 is inserted into the vacuum chamber 202 while the gas-tight condition is maintained by the bellows 305. The rod member 301 can hence transmit collision energy, which is to be input into its inner end present in the vacuum chamber 202, to the shock absorber 304 arranged outside the vacuum chamber 202, and can absorb the collision energy while the gas-tight condition of the vacuum chamber 202 is maintained. Also in this structure, when an excessive force acts on the rod member 301, the beam-like thin portion 308 is deformed or damaged in the first place such that deformation or destruction of the side plate 202b of the vacuum chamber 202 can be more assuredly prevented. With respect to other points, the third embodiment is also the same as the first embodiment.

(Fourth Embodiment)

Figure 10:
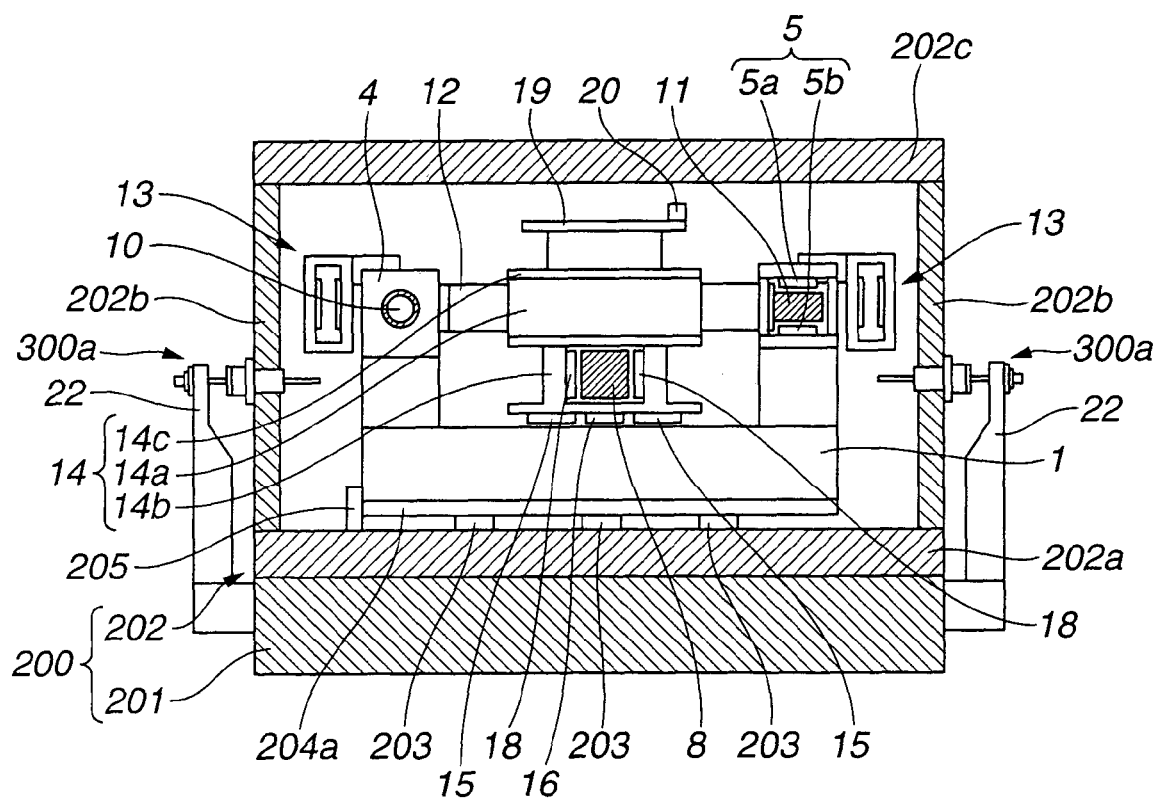
FIG. 10 is a cross-sectional view illustrating a portion of a fourth embodiment of a shock absorbing apparatus in a positioning apparatus according to the present invention.
Figure 11:
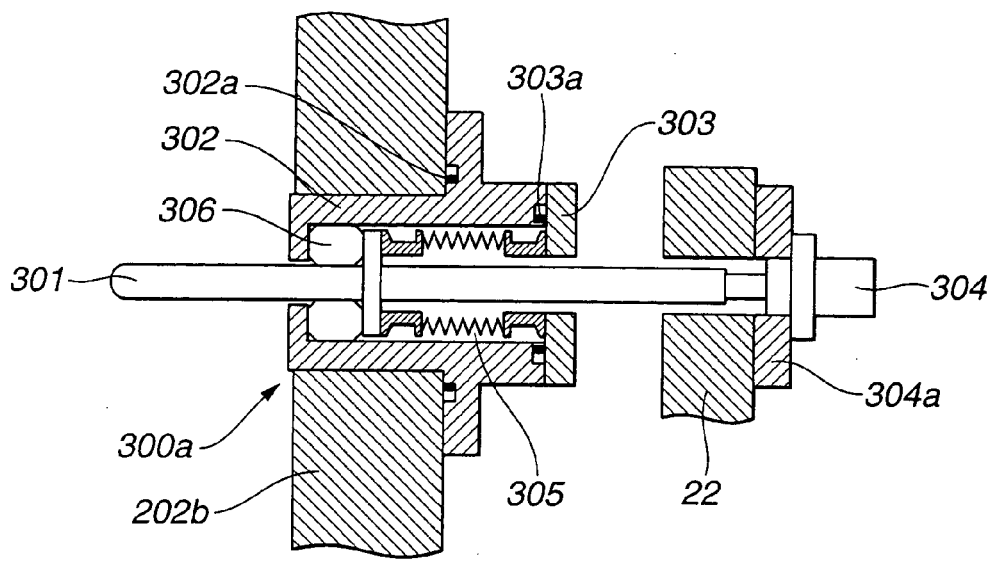
FIG. 11 is a cross-sectional view illustrating the shock absorbing apparatus provided in the positioning apparatus of the fourth embodiment.

A fourth embodiment of a shock absorbing apparatus in a positioning apparatus of the present invention will be described with reference to FIGS. 10 and 11. FIG. 10 is a cross-sectional view of a portion of this positioning apparatus. FIG. 11 is an enlarged view of a shock absorbing apparatus 300a which is a feature of this positioning apparatus. In FIG. 10, portions similar to corresponding portions in FIG. 2 are denoted by the same reference numerals as those in FIG. 2. In FIG. 10, reference numeral 22 represents a support member fixed to the base surface plate 201, to which the shock absorbing apparatus 300a is fixed.

In FIG. 11, portions similar to corresponding portions in FIG. 6 are denoted by the same reference numerals as those in FIG. 6. Also in this structure of the fourth embodiment, the rod member 301 is inserted into the vacuum chamber 202 while the gas-tight condition is maintained by the bellows 305. The rod member 301 can hence transmit collision energy, which is to be input into its inner end present in the vacuum chamber 202, to the shock absorber 304 arranged outside the vacuum chamber 202, and can absorb the collision energy while the gas-tight condition of the vacuum chamber 202 is maintained. Also in this structure, when an excessive force acts on the rod member 301, deformation or destruction of the side plate 202b of the vacuum chamber 202 can be assuredly prevented since the shock absorber 304 is fixed to the support member 22. With respect to other points, the fourth embodiment is also the same as the first embodiment.

(Fifth Embodiment)

Figure 12:
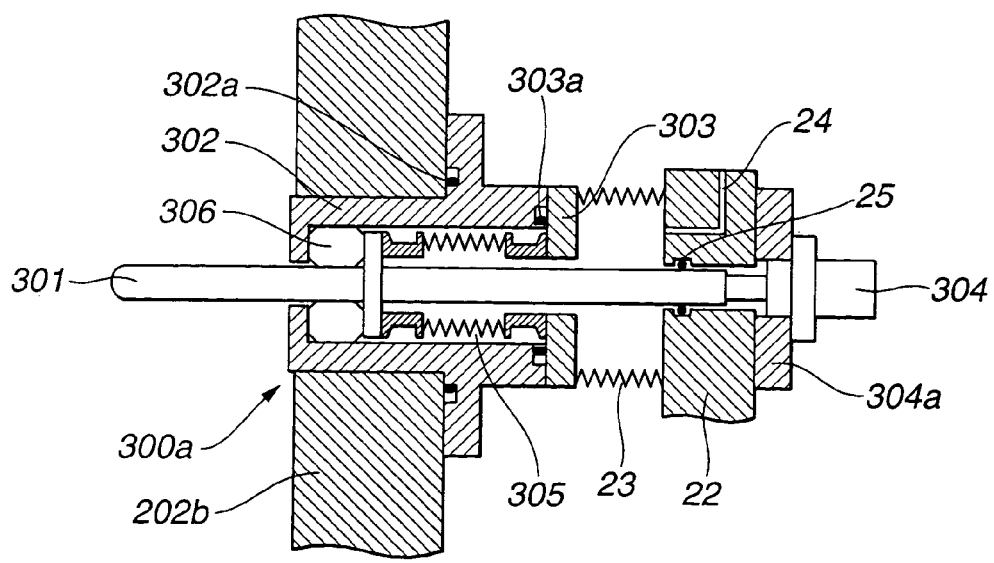
FIG. 12 is a cross-sectional view illustrating a fifth embodiment of a shock absorbing apparatus in a positioning apparatus according to the present invention.
Figure 13:
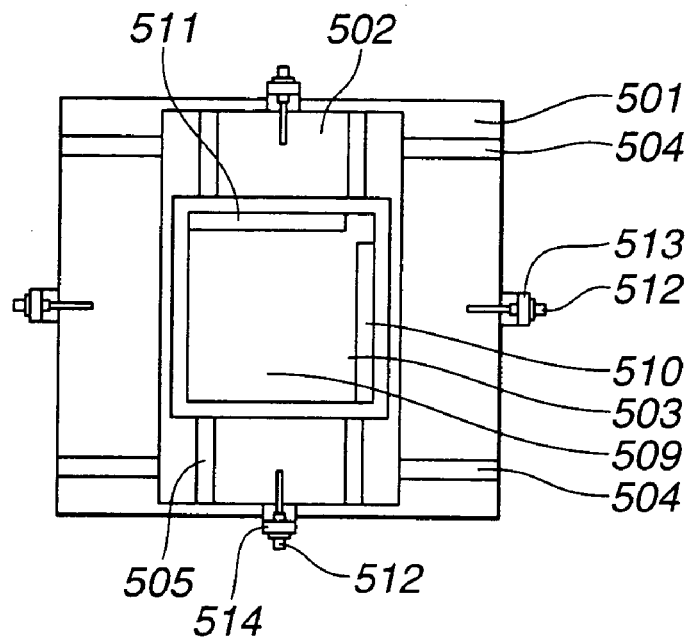
FIG. 13 is a plan view illustrating a conventional apparatus.
Figure 14:
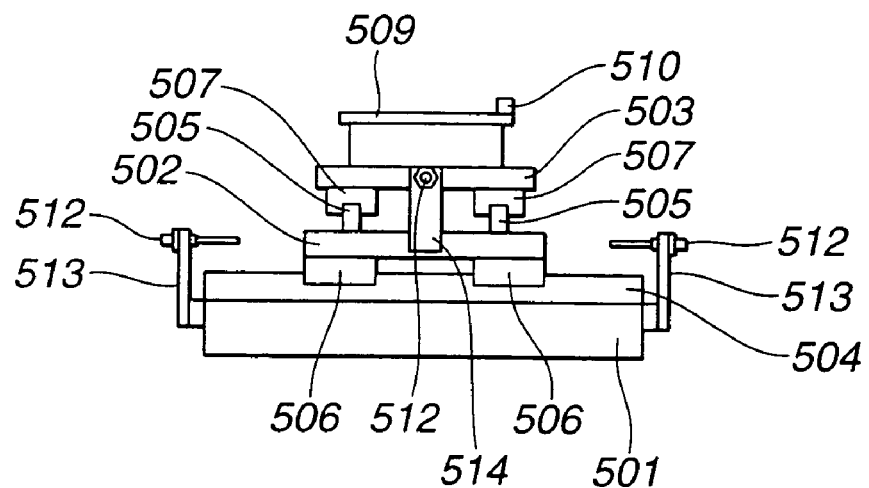
FIG. 14 is an end view illustrating the conventional apparatus of FIG. 13.

A fifth embodiment of a shock absorbing apparatus in a positioning apparatus of the present invention will be described with reference to FIG. 12. FIG. 12 is an enlarged view of a portion of a shock absorbing apparatus 300a which is a feature of this positioning apparatus. In FIG. 12, portions similar to corresponding portions in FIG. 6 are denoted by the same reference numerals as those in FIG. 6. In FIG. 12, reference numeral 22 represents a support member fixed to the base surface plate 201 similarly to the fourth embodiment, to which the shock absorbing apparatus 300a is fixed. In FIG. 12, denoted at 23 is a bellows serving as a second sealing member, one end of which is fixed to the cover member 303 under a gas-tight condition, and the other end of which is fixed to the support member 22 under a gas-tight condition. Denoted at 24 is an exhaust pipe provided in the support member 22. Denoted at 25 is an O-ring 303a serving as a third sealing member for sealing a space between the rod member 301 and the support member 22.

Also in the structure of the fifth embodiment, the rod member 301 is inserted into the vacuum chamber 202 while the gas-tight condition is maintained by the bellows 305. The rod member 301 can hence transmit collision energy, which is to be input into its inner end present in the vacuum chamber 202, to the shock absorber 304 arranged outside the vacuum chamber 202, and can absorb the collision energy while the gas-tight condition of the vacuum chamber 202 is maintained. Also in this structure, when an excessive force acts on the rod member 301, deformation or destruction of the side plate 202b of the vacuum chamber 202 can be assuredly prevented since the shock absorber 304 is fixed to the support member 22. Further, when a space, whose gas-tight condition is maintained by the second bellows 23 and the O-ring 25, is exhausted by a vacuum pump (not shown) or the like to be negative in its pressure, a difference in pressure between this space and the space in the vacuum chamber 202 can be made below one atmospheric pressure. Thereby, force (its magnitude is equal to an external pressure multiplied by the area of a mounting portion of the bellows 305) acting on the rod member 301 can be cancelled, and accordingly the collision energy can be effectively and assuredly absorbed softly.

In the above-discussed embodiments, the X-Y stage apparatus uses the static pressure bearing, however the guiding unit is not limited thereto. A shock absorbing apparatus of the present invention is applicable to a case where a rolling guide or the like is used. Further, a stage apparatus with a one-axis construction can be likewise employed, and a stage apparatus is not necessarily mounted at three points. A stage apparatus can be mounted standing on its overall bottom surface when its precision requirement permits it.

As described in the foregoing, in one aspect of the present invention, the shock absorbing apparatus does not need to be fixed to the stage apparatus, and hence increases in size of the stage apparatus and the total cost of the apparatus can be prevented. Further, there is no fear that the shock absorbing apparatus adversely affects the driving performance of the stage apparatus, thereby accomplishing its rapid and precise positioning in a non-atmospheric ambience. Moreover, the shock absorbing apparatus on a side other than the stage apparatus side effectively absorbs collision energy of violent run due to unexpected troubles, thereby preventing deformation and destruction or damage of the stage apparatus.

Further, in another aspect of the present invention, the shock absorber is disposed outside the chamber, thereby preventing contamination of the chamber due to leaks of fluid in the shock absorber. Further, the shock absorbing apparatus fixed to the partition member of the chamber separate from the stage apparatus effectively absorbs collision energy of violent run due to unexpected troubles, thereby preventing deformation and destruction or damage of the stage apparatus and the chamber.

Further, in still another aspect of the present invention, the thin portion is provided in the mounting portion of the shock absorbing apparatus, and the thin portion is constructed so as to be sacrificially deformed or damaged when an excessive force acts on the shock absorbing apparatus, thereby assuredly preventing deformation or destruction of the chamber, degradation of a degree of vacuum of the chamber, and destruction or damage of accompanying equipment such as a turbo molecular drag pump.

Further, in still another aspect of the present invention, the shock absorber of the shock absorbing apparatus is mounted to the support member provided separately from the chamber, thereby assuredly preventing deformation and destruction or damage of the chamber, degradation of a degree of vacuum of the chamber, and destruction or damage of accompanying equipment such as a turbo molecular drag pump.

Furthermore, in yet another aspect of the present invention, force of one atmospheric pressure acting on the shock absorbing apparatus from outside can be cancelled, and accordingly collision energy can be effectively and assuredly absorbed more softly.

While the present invention has been described with respect to what is presently considered to be the preferred embodiments, it is to be understood that the invention is not limited to the disclosed embodiments. The present invention is intended to cover various modifications and equivalent arrangements included within the spirit and the scope of the appended claims.

What is claimed is:

1. A shock absorbing apparatus comprising:
a rod member pressed against a shock absorber, one end of the rod member being inserted into a chamber for maintaining a region under a condition of vacuum or purged ambience, and the other end of the rod member being pressed against the shock absorber;
a flange member for fixing the shock absorber under a gas-tight condition to the chamber, the rod member being inside the flange member; and
a first sealing member inside the flange member for separating the shock absorber from said region, one end of the first sealing member is fixed to the rod member under a gas-tight condition inside the flange member, and the other end of the first sealing member is fixed to the shock absorber, or a mounting member for the shock absorber, or the flange member under a gas-tight condition.

2. A shock absorbing apparatus according to claim 1, further comprising a guide member for guiding said rod member; and said flange member being disposed approximately concentrically with said rod member, and fixing said shock absorber, or said mounting member to a partition member of the chamber under a gas-tight condition.

3. A shock absorbing apparatus according to claim 2, wherein said mounting member for said shock absorber is provided with a thin portion formed approximately concentric with said shock absorber.

4. A shock absorbing apparatus according to claim 2, wherein said mounting member for said shock absorber is provided with a beam-like thin portion.

5. A shock absorbing apparatus in a positioning apparatus, the positioning apparatus including a stage apparatus, a main body apparatus for mounting the stage apparatus thereto, and a chamber for maintaining a region, in which the stage apparatus is disposed, under a condition of vacuum or purged ambience, said shock absorbing apparatus comprising:
a rod member, one end of said rod member being inserted into the chamber, and the other end of said rod member being pressed against said shock absorber disposed outside the chamber;
a flange member, said flange member being disposed approximately concentrically around said rod member, and fixing said rod member to a partition member of the chamber under a gas-tight condition;
a guide member for guiding said rod member; and
a first sealing member inside the flange member, one end of said first sealing member being fixed to said rod member inside the flange member under a gas-tight condition, and the other end of said first sealing member being fixed to said flange member under a gas-tight condition, and
wherein a support member is fixed to a base surface plate of the main body apparatus, and supports said shock absorber, or a mounting member for said shock absorber.

6. A shock absorbing apparatus according to claim 5, further comprising a second sealing member for enclosing a space formed outside the chamber by said first sealing member and said support member under a gas-tight condition; a third sealing member for maintaining a clearance between said rod member and said support member under a gas-tight condition; and means for bringing the space enclosed by said second sealing member under an approximately vacuum condition.

* * * * *

UNITED STATES PATENT AND TRADEMARK OFFICE
CERTIFICATE OF CORRECTION

PATENT NO. : 7,198,141 B2  Page 1 of 1
APPLICATION NO. : 10/653287
DATED : April 3, 2007
INVENTOR(S) : Tadayuki Kubo et al.

It is certified that error appears in the above-identified patent and that said Letters Patent is hereby corrected as shown below:

ON THE TITLE PAGE:
Item "(56) References Cited," under "FOREIGN PATENT DOCUMENTS," on "Page 2," in the second column, the fourth-listed document "JP   10/340938   12/1998" should be deleted.
Item "(56) References Cited," under "OTHER PUBLICATIONS," in the second line of the listed document, "pat nt" should read -- patent --.

COLUMN 1:
Line 51, "10(1998)-340938" should read --10-340938 --.

COLUMN 2:
Line 51, "member" should read -- member, --.
Line 53, "member" should read -- member, --.

COLUMN 3:
Line 14, "member" should read -- member, --.
Line 21, "member" should read -- member, --.

COLUMN 7:
Line 33, "portions" should read -- portion --.

Signed and Sealed this

Eleventh Day of December, 2007

JON W. DUDAS
*Director of the United States Patent and Trademark Office*